United States Patent [19]
Johnson

[11] Patent Number: 5,228,767
[45] Date of Patent: * Jul. 20, 1993

[54] HEADLIGHT LENS WITH EXTERNAL LIGHT SENSITIVITY

[76] Inventor: Michael B. Johnson, 8 Kent La., Bloomfield, Conn. 06002

[*] Notice: The portion of the term of this patent subsequent to Oct. 8, 2008 has been disclaimed.

[21] Appl. No.: 856,481

[22] Filed: Mar. 24, 1992

[51] Int. Cl.⁵ .............................. F21M 3/02
[52] U.S. Cl. ...................... 362/61; 362/276; 362/458
[58] Field of Search ............ 362/61, 293, 276, 307, 362/308, 311, 326, 351, 458; 359/241

[56] References Cited
U.S. PATENT DOCUMENTS

| | | | |
|---|---|---|---|
| 2,499,555 | 3/1950 | Wronkowski | 362/61 |
| 2,734,129 | 2/1956 | Kahla | 362/61 |
| 2,807,711 | 9/1957 | McDonald | 362/61 |
| 4,217,391 | 8/1980 | Kaltz | 359/241 |
| 4,225,904 | 9/1980 | Linder | 362/61 |
| 4,261,656 | 4/1981 | Wu | 359/241 |
| 4,306,772 | 12/1981 | Harrigan | 359/241 |
| 4,889,413 | 12/1989 | Ormsby et al. | 359/241 |
| 5,055,982 | 10/1991 | Johnson | 362/61 |

Primary Examiner—Richard R. Cole
Attorney, Agent, or Firm—McCormick, Paulding & Huber

[57] ABSTRACT

A headlight lens is fabricated from photochromic glass so that the headlight is not noticeable during daylight hours when subjected to ultraviolet light. At night, in the absence of ultraviolet light, the lens is transparent and emits the light from inside the headlight.

2 Claims, 1 Drawing Sheet

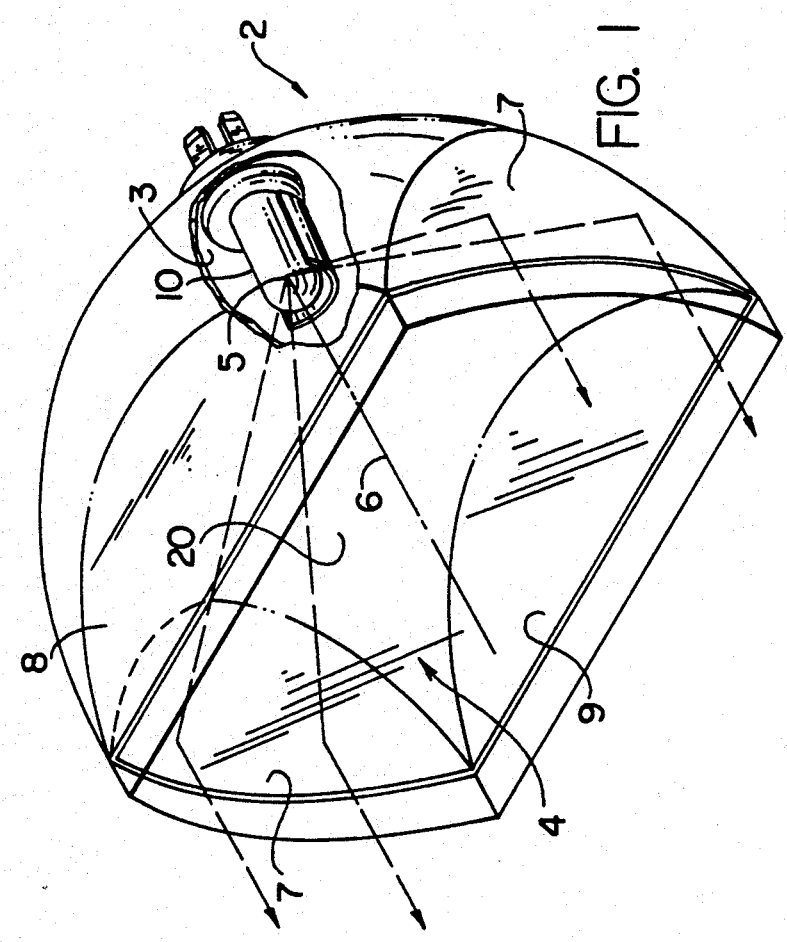

HEADLIGHT LENS WITH EXTERNAL LIGHT SENSITIVITY

BACKGROUND OF THE INVENTION

The invention represents an improvement over my prior U.S. Pat. No. 5,055,982. In my prior patent an external headlight cover is provided on a vehicle particularly on an automobile, and may be provided in spaced relationship to an automobile headlight. The disclosure in my prior U.S. Pat. No. 5,055,982 is incorporated by reference herein. The present invention deals with a headlight that is provided with a lens portion having the characteristics of the cover disclosed in my prior patent.

BRIEF DESCRIPTION OF THE DRAWINGS

FIG. 1 shows in perspective view a headlight fitted with an envelope having a lens portion constructed in accordance with the present invention.

DETAILED DESCRIPTION

The single FIGURE shows a rectangular motor vehicle headlight comprising a reflecting body 2 that in turn comprises a rear wall 3 an inner reflecting surface 4 which is in the form of a paraboloid having a focal point 5 and a substantially horizontal optical axis 6.

The reflecting body 2 also comprises two substantially vertical lateral end walls 7, and a top and a bottom wall, 8 and 9 respectively, which walls are parallel to one another and to said optical axis 6.

The headlight also includes a source of light in the form of lamp 10 with a filament located at the focal point 5.

In accordance with the present invention the headlight further includes a front face or lens 20 which comprises a portion of the overall envelope defined in part by those elements of the headlight described above. The lens 20 is fabricated from a photochromic glass or equivalent material similar such as disclosed in my prior U.S. Pat. No. 5,055,982. More particularly, the front face or lens of the headlight is preferably fabricated from an photochromic glass of the type commonly utilized in eyeglasses. Such material is clear and transparent in the absence of sunlight, but when subjected to ultraviolet light is darkened and gives the appearance of sunglasses.

As pointed out in my prior patent such glass may be darkened so as to appear opaque from one side, or may simply take the form of a smoked glass appearance. When in a phase where the glass is adapted to assume a sunglass tint the lens 20 will be darkened, or mirrored, or appear to have a tint such as green or gray.

Thus, the preferred form of glass used in the headlight lens depicted in FIG. 1 is perfectly clear in the absence of ultraviolet light, but assumes a mirror or darkened appearance in the presence of ultraviolet energy from the sun (or from any other U. V. source).

The actual technology of photochromic reaction is not presented in the present disclosure, but applicant notes that present technology provides for different colorings of photochromic glass depending upon the material chosen for the fabrication of the glass. Therefore, the present invention contemplates providing for different colors when the headlight lens is in its opaque or semi-opaque condition as described above.

I claim:

1. A headlight comprising a source of illumination and an envelope surrounding said source of illumination, said envelope including a lens for receiving the light from said light source, said lens comprising a photochromic sheet means that is optically transparent in the absence of sunlight, said sheet means exhibiting a darkened appearance when exposed to sunlight.

2. The headlight of claim 1 wherein said lens exhibits a pigmentation such that a particular color is provided when the lens is in its darkened state.

* * * * *